United States Patent [19]

Eppinger

[11] Patent Number: 4,818,108
[45] Date of Patent: Apr. 4, 1989

[54] PHASE MODULATED RONCHI TESTING OF ASPHERIC SURFACES

[75] Inventor: Hans J. Eppinger, Des Plaines, Ill.

[73] Assignee: Hughes Optical Products, Inc., Des Plaines, Ill.

[21] Appl. No.: 132,225

[22] Filed: Dec. 14, 1987

[51] Int. Cl.[4] .............................................. G01B 9/02
[52] U.S. Cl. .................................... 356/360; 356/124; 356/363; 356/376
[58] Field of Search ................ 356/359, 360, 363, 371, 356/376, 124

[56] References Cited

U.S. PATENT DOCUMENTS 3,907,438  9/1975  Holeman ............................ 356/376
4,212,073  7/1980  Balasubramanian ............ 356/376 X

OTHER PUBLICATIONS

Brooks et al., "Moiré Gauging Using Optical Interference Patterns", *Applied Optics*, vol. 8, No. 5, pp. 935-939, 5/69.
Cataqai, "Friuge Scanning Ronchi Test for Aspherical Surfaces", *Applied Optics*, vol. 23, No. 20, pp. 3676-3679, 10/84.

Primary Examiner—Davis L. Willis
Assistant Examiner—Matthew W. Koren
Attorney, Agent, or Firm—L. B. Sternfels; W. J. Streeter; A. W. Karambelas

[57] ABSTRACT

An apparatus and method for measuring the surface contour of an aspheric optical surface 36. This is accomplished by splitting a single coherent beam of light into two individual beams with one beam tilted with respect to the other. The degree of tilt is adjusted until a single interference fringe is observed. This single fringe is then directed onto the aspheric surface 36 under test by means of a focusing lens 30. By the use of a beam splitter 24 the reflected fringe is then directed onto a multi-element optical detector 40. The shape of the fringe reflected onto the detector 40 corresponds to the shape of the aspheric surface 36. A phase modulating mirror 26 is then moved to increase or decrease the path length of one of the two interfering beams of light. This results in sweeping the fringe across the entire aspheric surface 36 so that the entire aspheric surface 36 can be measured. The result is an easy to perform measurement of the aspheric surface 36 which is close to diffraction limited. Further, the above invention does not require a laboratory environment.

17 Claims, 1 Drawing Sheet

PHASE MODULATED RONCHI TESTING OF ASPHERIC SURFACES

BACKGROUND OF THE INVENTION

1. Technical Field

This invention relates to lens testing systems and more particularly to a system for testing aspheric surfaces utilizing a phase modulated Ronchi interference pattern.

2. Discussion

Lenses made with aspheric surfaces are frequently employed to correct for spherical aberrations. In an aspheric lens the curve of the lens is not defined by a circle. Grinding aspheric surfaces is a difficult and tedious process which requires precise manufacturing techniques.

Equally important to the quality of the resulting lens is the accuracy of the technique used to measure the shape of the lens surface at various stages in the manufacturing process. Various methods have been employed to measure lens surface contours. One system has been developed to perform such measurements simultaneous with the manufacturing process. For example, see U.S. Pat. No. 4,561,333 issued to Kohno, et. at. This patent discloses a technique for performing the Hartmann test during diamond turning of a metal mirror.

The Ronchi test is another well known technique for performing qualitative tests on lens surfaces. A Ronchi grating is an optical device consisting of ruled lines of a certain frequency. In the Ronchi test, this fringe pattern is projected onto the lens surface under test, and the fringes reflected off the lens will then be distorted in a predictable way depending on the shape of the surface of the lens under test. Deviation from the predicted reflected fringe shape will represent geometric aberrations or defects in the lens surface. Upon detecting such aberrations, the lens may then be corrected by further manufacturing processes.

Of course, the quality of the resulting lens or mirror surface will depend on the accuracy of the measuring technique. The Ronchi test as previously employed has had limited accuracy in testing aspheric surfaces. Other methods have been developed, such as the use of computer generated holograms, shearing interferometers, and the deformed grating method. In all of these methods, the accuracy is limited. U.S. Pat. No. 4,212,073 issued to N. Balasubramanian, describes an improved Ronchi test. This technique however, requires sophisticated analysis of the detected signal.

A quantitative Ronchi test utilizing a synchronous phase detection technique, is described in T. Yatagai, "Fringe scanning Ronchi test for aspherical surfaces", 23 Applied Optics 3676 (1984). This technique employs a system which utilizes a moveable Ronchi grating for testing light passing through a refractive lens. However, this technique is not suitable for testing a mirror surface or for testing a single surface of a refractive lens in a reflecting mode. Further, in this and other prior methods of Ronchi testing, the selection of the spatial frequency of the ruling resulted in a compromise in measurement precision. This is because the use of a too high frequency ruling will cause diffraction, causing the wave fronts to interfere and reducing the precision of the measurement; a too low frequency ruling introduces geometric measurement errors.

Thus, it would be desirable to provide a way to accurately measure a single aspheric surface in the reflective mode which does not require elaborate instrumentation. It would further be desirable to provide an accurate Ronchi test which can be performed in a manufacturing setting without the need for a laboratory environment.

SUMMARY OF THE INVENTION

The present invention provides a very precise method for testing aspheric surface contours. This is accomplished by creating an interference fringe pattern containing a single fringe. The use of a single fringe prevents the introduction of geometric aberrations that several individual fringes would present. The fringe pattern is created by directing a coherent light source, such as a laser, into a beam expander where it is collimated. This beam is then split into two components by means of a beam splitter. One component reflects off a fixed mirror and combines with a second component, which is reflected by a phase modulating mirror. The combined beams are tilted with respect to each other by a very small amount. It is this tilt between the two beams which causes an interference pattern consisting of straight fringes which appear at a fixed frequency whenever the path length between the two beams differs by one half of the wavelength of light. The amount of tilt is then adjusted until only a single interference fringe is observed.

The two coaxial beams containing the fringe pattern are then focused to a point by a focusing lens. The aspheric surface under test is positioned so that the paraxial focus of the asphere is in coincidence with the focal point of the focusing lens. The two coaxial beams are thus directed onto the asphere and are reflected back along the same path back through the focusing lens. A second beam splitter then relays the reflected image onto a detector array.

The phase modulating mirror is then moved in steps over a distance of one wave length along the axis of the single beam incident upon it. This changes the optical path length difference between the two coaxial beams and causes the fringe to move across the beam diameter. This results in the fringe being reflected at different field heights off the asphere. The detector then encodes the geometry of the reflected fringe. If the surface under test were a sphere, the fringe reflected onto the detector would be straight since all rays are reflected back to the paraxial focus regardless of field height. For an aspheric surface, the fringe is curved in a predictable way. The aspheric shape of the surface causes reflected rays to become geometrically aberrated from their point of origin in the paraxial focal point of the asphere. The amount of geometric aberration, and thus the shape of the reflected fringe, can be calculated from the aspheric prescription of the surface under test. Any deviation from this predicted curve represents aberrations or defects in the lens surface.

The present invention results in a simple test which does not require a sophisticated apparatus nor complicated calculations. Finally, this technique permits precise measurements to be made which are close to diffraction limited, since all rays are emanating from one point in contrast to conventional techniques which require the use of a Ronchi pattern of a certain physical size.

BRIEF DESCRIPTION OF THE DRAWINGS

The various advantages and features of the present invention will become apparent to one skilled in the art from the detailed description of the preferred embodiment, which makes reference to the following set of drawings.

DESCRIPTION OF THE PREFERRED EMBODIMENT

Figure 1:
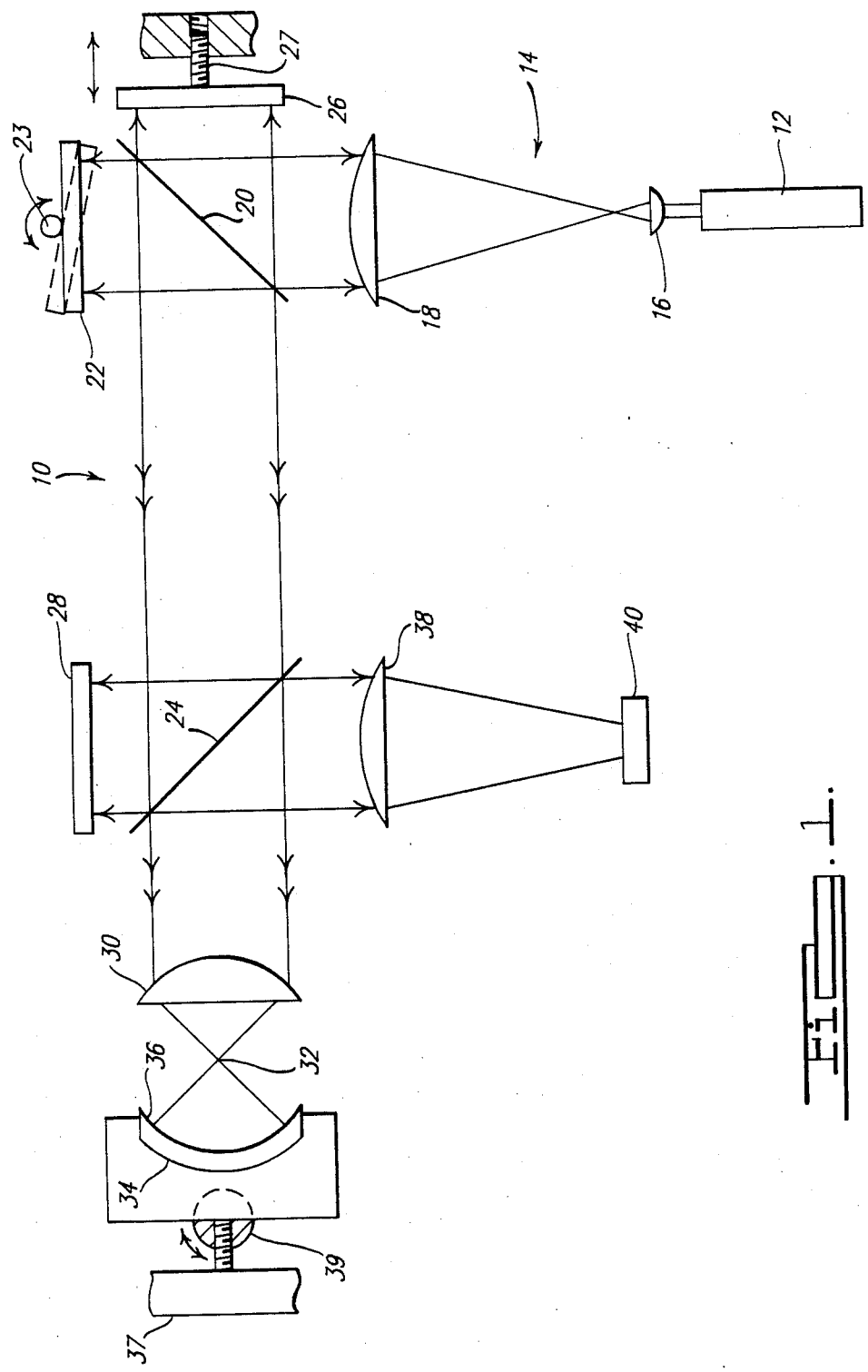
FIG. 1 is an optical schematic diagram of a phase modulated Ronchi testing apparatus made in accordance with the teachings of this invention.

Referring to FIG. 1, the preferred embodiment of the phase modulated Ronchi testing system 10, according to the present invention, is shown. A coherent light source 12 is provided, which may consist of a laser. Light from the light source 12 is first directed into a beam expander 14. In one embodiment according to the present invention, the beam expander 14 comprises a pair of lens 16 and 18. The beam expander 14 produces a collimated beam of light with an increased diameter.

In the path of this expanded beam is a first beam splitter 20 which may comprise an optically flat piece of glass. The first beam splitter 20 is mounted at approximately a 45° angle with respect to the incident beam of light.

A portion of the light incident upon the beam splitter 20 will be transmitted and a portion will be reflected. The transmitted portion is directed toward a fixed mirror 22. The fixed mirror 22 is mounted nearly perpendicular to the incident light. The light reflected off the fixed mirror 22 is again split by the beam splitter 20; a portion of the light is reflected and a portion is transmitted. The transmitted portion travels back toward the coherent light source 12 and is of no further use in the present apparatus. The reflected portion is directed in a transverse direction toward a second beam splitter 24.

The portion of the intial beam from the beam expander 14, which is reflected by the first beam splitter 20, is directed towards a phase modulating mirror 26. This mirror is mounted nearly perpendicular to the light incident upon it. The reflected light is then split again by the beam splitter 20, with a portion being transmitted through the beam splitter 20 and toward the second beam splitter 24. Also, a portion is reflected by the beam splitter 20 back toward the light source 12, but this portion has no effect on the present invention.

As a result of the foregoing, two coaxial beams of light are directed toward the second beam splitter 24. If the fixed mirror 22 and the phase modulated mirror 26 are equally distant from the center of the first beam splitter 20, and if the two mirrors are precisely perpendicular to the respective incoming beam, then the optical path length of the two beams will be equal and the cross-section of the two coaxial beams of light directed toward the beam splitter 24 will be of nearly uniform intensity. Either the fixed mirror 22 or the phase modulated mirror 26 is rotatably mounted so that its position can be slightly tilted with respect to the incident light. For example, the fixed mirror 22 may be mounted on axis 23 as shown in FIG. 1. As a result of this tilt, one of the two coaxial beams traveling toward the second beam splitter 24 will be at a slight angle with respect to the other. This results in an interference fringe pattern where destructive interference, or a dark fringe, is observed whenever the angular relationship between the two beams causes an optical path difference of one half of a wave length. Either the fixed mirror 22 or the phase modulated mirror 26 can be tilted to achieve this effect. The spatial frequency of the fringe can be adjusted by changing the degree of tilt. In accordance with the present invention, the tilt is adjusted until a single fringe is observed.

The phase modulated mirror 26 is attached to a sliding mount 27 which permits motion in a direction parallel with the light incident upon it. As will be appreciated by those skilled in the art, the sliding mount may consist of a screw thread of the type commonly employed in a Michelson Interferometer. The motion of the phase modulated mirror 26 will cause the optical path of the light reflected from this mirror to change relative to the coaxial light beam that is reflected from the fixed mirror 22. The change in optical path length will cause the interference fringe pattern to move from one side of the beam to the other.

The two interfering coaxial beams are then directed through the second beam splitter 24 which transmits a portion of the light and reflects a portion to an interferometer mirror 28. The portion that is transmitted then passes through a focusing lens 30. The focusing lens 30 has a focal point 32, and the incident light is directed to a focus at this focal point 32. The light then diverges and is incident upon the optical device under test 34. The device under test is attached to a sliding mount 37 and axis 39. This optical device 34 may be either a mirror or a refractive lens. It has a surface 36, which, according to the present invention, is an aspheric surface. The optical device under test 34 also has a paraxial focal point and an optical axis. The position of the optical device under test 34 is moved by means of sliding mount 37 so that its focal point is at the same position as the focal point 32 of the focusing lens 30. Coincidence between the two foci and the two optical axes is achieved by use of the interferometer mirror 28. This procedure will be described later.

The light from the two coaxial beams that is incident on the device under test 34, upon reflection, passes back through the focal point 32 and through the focusing lens 30. It then is reflected by the second beam splitter 24 to a lens 38. This lens 38 then focuses the light onto an optical detector 40. The optical detector 40 may consist of a charge coupled device (CCD) array, or any number of types of photosensitive arrays which can detect the intensity of light at a number of points. For example, the detector 40 may be an array of 16×16 optical sensors. Photographic film may also be used to record the resulting fringe.

As described above, the tilt of either the fixed mirror 22 or the phase modulated mirror 26 introduces a single interference fringe pattern into the two coaxial beams. Therefore, this fringe is projected onto the aspheric surface 36 and the reflected fringe is directed onto the optical detector 40. If the aspheric surface 36 were spherical, the fringe would be a straight line. An aspheric surface will produce a curved fringe. The shape of this curve can be calculated from the equation of the slope of the aspheric. Any deviation from this predicted curve indicates errors or defects in the aspheric surface. Such errors may be then corrected by further manufacturing process, or the device may have to be discarded. Such tests may be preformed frequently throughout the manufacturing process to assure close compliance with the desired aspheric shape.

The resulting fringe that is detected will indicate the shape of the aspheric surface 36 at a given linear position. That is because the fringe is reflected from the aspheric surface along a single line. To test the entire aspheric surface, the phase modulated mirror 26 is utilized. As discussed above, moving the phase modulated mirror 26 by means of sliding mount 27 will cause the fringe to move across the field of the two coaxial beams of light. This will cause the fringe to move across the aspheric surface 36. This motion will be at a rate which corresponds to the rate of motion of the phase modulated mirror 26. For example, this may be an oscillating motion at a rate of 1 Hertz. In this way, the entire surface of the aspheric surface 36 can be tested. The number of individual test points will be limited by the resolution of the optical detector 40. For example, if the detector is a 16×16 array, 256 individual points on the aspheric surface 36 can be tested.

As mentioned previously, the interferometer mirror 28, is used to assure coincidence between the paraxial focal point of the optical device under test 34 and the focal point of the focusing lens 30. This is a accomplished as follows. First, one of the two coaxial beams is blocked at a point before it is incident on the second beam splitter 24. The remaining beam of light is then incident upon the second beam splitter 24 and a portion is reflected toward the interferometer mirror 28 and is then reflected back through the second beam splitter 24 and onto the detector 40. This light is superimposed upon that portion of the single beam which is transmitted by the second beam splitter 24 and which is then reflected by the aspheric surface 36 and is incident on the optical detector 40. If the foci and optical axes of the device under test 34 and the focusing lens 30 coincide, the light from the interferometer mirror 28 will not cause a fringe pattern related to the central portion of the device under test 34 at the optical detector 40. If they are not in coincidence, the resulting fringe pattern will consist of concentric or differently shaped fringes in said central portion due to interference with the light from the interferometer mirror 28. Thus, to assure coincidence between the two foci and the two axes, the position of the device under test 34 is adjusted by means of sliding mount 37 and axis 39. This is accomplished by first adjusting the device under test 34 about axis 39 until the fringes observed are truly circular. This will assure that the optical axis of the focusing lens 40 coincides with the optical axis of the device under test 34. If this is not done the resulting measurements of the aspheric surface 36 will be erroneous. Next, the device under test 34 is adjusted by means of sliding mount 37 until the central portion is void of circular fringes. This assures that the foci of the device under test 34 and the focusing lens 30 coincide. The adjustment is now complete, and the interferometer mirror 28 is blocked and the second beam is unblocked. The apparatus is ready to be used to measure the aspheric surface 36.

The above apparatus is easy to construct and does not require a laboratory environment. It also permits very precise measurements of the geometry of an aspheric surface to be performed without extensive calculations. Those skilled in the art will come to appreciate that other advantages and modifications of the particular examples set forth herein are obtainable without departing from the spirit of the invention as defined in the following claims.

What is claimed is:

1. Apparatus for measuring the shape of aspheric surfaces comprising:
   a coherent light source;
   means for expanding the beam of light from the coherent light source;
   means for splitting the light from the beam expanding means into two coaxial beams;
   means for focusing and directing the two coaxial beams onto the aspheric surface to be measured;
   means for adjusting the position the aspheric surface so that the optical axis of the aspheric surface coincides with the optical axis of the focusing means;
   means for detecting incident light;
   means for tilting one of coaxial beams with respect to the other to create an interference pattern between the coaxial beams; and
   means for directing the light reflected from the aspheric surface onto the detector, whereby the interference pattern sensed by the detector gives an indication of the shape of the aspheric surface.

2. The apparatus of claim 1 further comprising:
   means for modulating the optical path length of one of the two coaxial beams, thereby causing the interference pattern to move across the aspheric surface, thus permitting the shape of the entire aspheric surface to be measured by the detector.

3. The apparatus of claim 2 wherein the means for splitting the light beam from the coherent light source into two coaxial beams comprises:
   a first beam splitter mounted at approximately a 45° angle with respect to the light beam, said first beam splitter transmitting a portion of the light beam emitted from the beam expander and also reflecting a portion of said beam;
   a fixed mirror mounted in the path of that portion of the light beam that is transmitted through the first beam splitter, said the fixed mirror also being mounted approximately perpendicular to said light transmitted through the first beam splitter, whereupon the transmitted light is reflected from the fixed mirror back to the beam splitter where the light is again split with a portion being transmitted and a portion being reflected in a direction transverse to the axis of the light emitted from the coherent light source; and
   a second mirror movably mounted perpendicular to the fixed mirror and in the path of the portion from the light of the beam expander that is reflected by the first beam splitter, whereupon the light that is reflected by the second mirror is directed back to the beam splitter and a portion of this light is transmitted through the first beam splitter in a direction transverse to the direction of the original coherent light source.

4. The apparatus of claim 3 wherein the means for focusing and directing the two coaxial beams onto the aspheric surface to be measured comprises:
   a second beam splitter mounted in the path of the two transverse light beams that are reflected from the fixed mirror and from the second mirror, the second beam splitter being mounted perpendicular to the first beam splitter, whereupon the light from the two transverse light beams are split, one portion being transmitted and the second portion being reflected;
   a focusing lens mounted in the path of the two light beams after they are transmitted through the second beam splitter; and
   said aspheric surface being mounted in the path of the light transmitted from the focusing lens and reflecting this light back toward the focusing lens, the aspheric surface being positioned such that the focal point of the aspheric surface coincides with the focal point of the focusing lens.

5. The apparatus of claim 3 wherein the means for directing the light reflected from the aspheric surface onto the detector comprises:
a lens mounted in the path of the two light beams at a point after these beams have been reflected from the aspheric surface back through the focusing lens and then reflected off the second beam splitter.

6. The apparatus of claim 1 wherein the coherent light source is a laser.

7. The apparatus of claim 3 wherein the aspheric surface is a mirror.

8. The apparatus of claim 7 wherein the means for tilting one of the coaxial beams comprises:
a rotating means attached to the fixed mirror for tilting the fixed mirror with respect to the second mirror, whereby the spatial frequency of the interference pattern thus created can be adjusted.

9. The apparatus of claim 8 wherein the means for tilting one of the coaxial beams is adjusted so that a single interference fringe is projected onto the aspheric surface, whereby geometric aberrations in the reflected fringe are minimized.

10. The apparatus of claim 3 wherein the means for modulating the optical path length of one of the two coaxial beams comprises:
a means for moving the second mirror in a direction perpendicular to the direction of the light incident upon it, whereby the optical path lengths of one of the two transverse beams of light is increased or decreased by approximately one wave length.

11. The apparatus of claim 1 wherein the detecting means includes a means for taking repeated measurements of the resulting fringe or fringes as the fringe or fringes move across the aspheric surface.

12. The apparatus of claim 10 wherein the means for measuring the shape of the fringe comprises:
a multi-element charged coupled device array coupled to a circuit means for measuring and displaying the intensity of the light incident upon each element of the charged coupled device array.

13. The apparatus of claim 1 wherein the means for adjusting the position of the aspheric surface until the optical axis of the aspheric surface coincides with the optical axis of the focusing means comprises:
an interferometer mirror for receiving one beam of light reflected by the second beam splitter and reflecting the beam back through the second beam splitter and onto the detector;
means for moving the aspheric surface about an axis perpendicular to the beam, until a symmetric fringe pattern is observed at the detector; and
means for adjusting the position of the aspheric surface along the optical axis until no fringes are observed at the detector.

14. Apparatus for measuring aspheric surfaces comprising:
a laser light source;
a beam expander mounted in the light path of the coherent light source for increasing the diameter of the light beam from the coherent light source;
a first beam splitter mounted at approximately 45° angle with respect to the light beam, said first beam splitter transmitting a portion of the light beam emitted from the beam expander and also reflecting a portion of said beam;
a fixed mirror mounted in the path of that portion of the light beam that is transmitted through the first beam splitter, said the fixed mirror also being mounted approximately perpendicular so said light transmitted through the first beam splitter, whereupon the transmitted light is reflected from the fixed mirror back to the beam splitter, where the light is again split with a portion being transmitted and a portion being reflected in a direction transverse to the axis of the light emitted from the coherent light source;
a second mirror movably mounted approximately perpendicular to the fixed mirror and in the path of the portion of the light from the beam expander that is reflected by the first beam splitter whereupon the light that is reflected by the second mirror is directed back to the beam splitter and a portion of this light is transmitted through the first beam splitter in a direction transverse to the direction of the original coherent light source;
a second beam splitter mounted in the path of the two transverse light beams that are reflected from the fixed mirror and from the second mirror, the second beam splitter being mounted perpendicular to the first beam splitter whereupon the light from the two transverse light beams are split, one portion being transitted and a second portion being reflected;
a pivotal axis upon which the fixed mirror is mounted whereby the fixed mirror can be tilted at a small angle thereby creating an interference pattern between the two transverse light beams;
an interferometer mirror mounted in the path of the light reflected from the second beam splitter;
a focusing lens mounted in the path of the two light beams transmitted through the second beam splitter;
an aspheric surface mounted in the path of the light transmitted from the focusing lens which reflects this light back toward the focusing lens, the aspheric surface being positioned such that the optical axis of the aspheric surface coincides with the optical axis of the focusing lens;
a second lens mounted in the path of the two light beams at a point after these beams have been reflected from the aspheric lens back through the focusing lens and then reflected off the second beam splitter;
a detector for detecting the light which is transmitted through the second lens whereby one or more interference fringes can be sensed by the detector and the shape of the detected fringe pattern gives an indication of the shape of the aspheric surface; and
means for moving said second mirror whereby the path length of one of the two transverse beams of light is increased or decreased by approximately one wavelength, thereby causing the interference fringe to move across the aspheric surface thus permitting the entire aspheric surface to be measured by the detector.

15. A method for measuring the shape of aspheric surfaces comprising:
providing a coherent light source;
expanding the beam of light from the coherent light source;
splitting the expanded light beam into two coaxial beams;

focusing and directing the two coaxial beams onto the aspheric surface to be measured;

adjusting the position of the aspheric surface so that the focal point of the aspheric surface coincides with the focal point of the focusing means;

tilting one of the two coaxial beams with respect to the other to create an interference pattern between the two coaxial beams;

providing a means for detecting light;

directing the light reflected from the aspheric surface onto the detector, whereby the interference pattern sensed by the detector gives an indication of the shape of the aspheric surface.

16. The method of claim 15 further comprising the step of:

modulating the optical path length of one of the two coaxial beams, thereby causing the interference pattern to move across the aspheric surface, thus permitting the shape of the entire aspheric surface to be measured by the detector.

17. The method of claim 15 wherein the step of the tilting one of the two coaxial beams further comprises the step of tilting one of the two coaxial beams until a single interference fringe is projected onto the aspheric surface, whereby geometric aberrations in the reflected fringe are minimized.

* * * * *